United States Patent
Black et al.

(10) Patent No.: US 9,141,956 B2
(45) Date of Patent: Sep. 22, 2015

(54) USING BIOMETRIC TOKENS TO PRE-STAGE AND COMPLETE TRANSACTIONS

(75) Inventors: Jonathan Simon Black, Dundee (GB); Steven James Birnie, Dundee (GB); Shaun McWhinnie, Dundee (GB)

(73) Assignee: NCR Corporation, Duluth, GA (US)

(*) Notice: Subject to any disclaimer, the term of this patent is extended or adjusted under 35 U.S.C. 154(b) by 2081 days.

(21) Appl. No.: 11/559,027

(22) Filed: Nov. 13, 2006

(65) Prior Publication Data
US 2008/0114697 A1    May 15, 2008

(51) Int. Cl.
G06Q 20/40 (2012.01)
G06Q 20/28 (2012.01)
G06Q 20/36 (2012.01)
G07C 9/00 (2006.01)

(52) U.S. Cl.
CPC .......... *G06Q 20/4014* (2013.01); *G06Q 20/28* (2013.01); *G06Q 20/3674* (2013.01); *G06Q 20/40* (2013.01); *G07C 9/00158* (2013.01); *G07C 9/00087* (2013.01); *G07C 9/00166* (2013.01)

(58) Field of Classification Search
CPC ... G06Q 20/28; G06Q 20/3674; G06Q 20/40; G06Q 20/4014; G07C 9/00158; G07C 9/00166; G07C 9/00087
USPC .............................................. 705/64, 16–25
See application file for complete search history.

(56) References Cited

U.S. PATENT DOCUMENTS

| | | | | |
|---|---|---|---|---|
| 4,186,871 A * | 2/1980 | Anderson et al. | ............... | 705/71 |
| 4,605,820 A * | 8/1986 | Campbell, Jr. | .................. | 705/71 |
| 4,914,569 A * | 4/1990 | Levine et al. | ........................ | 1/1 |
| 5,546,523 A * | 8/1996 | Gatto | ............................ | 715/811 |
| 5,748,765 A * | 5/1998 | Takhar | .......................... | 382/124 |
| 5,764,789 A * | 6/1998 | Pare et al. | ..................... | 382/115 |
| 5,790,677 A * | 8/1998 | Fox et al. | ........................ | 705/78 |
| 5,805,719 A * | 9/1998 | Pare et al. | ..................... | 382/115 |
| 5,907,848 A * | 5/1999 | Zaiken et al. | ......................... | 1/1 |
| 6,003,019 A * | 12/1999 | Eaton et al. | ..................... | 705/42 |
| 6,012,049 A * | 1/2000 | Kawan | ............................ | 705/41 |
| 6,012,050 A * | 1/2000 | Eaton et al. | ..................... | 705/42 |
| 6,219,793 B1 * | 4/2001 | Li et al. | ........................... | 726/19 |
| 6,305,603 B1 * | 10/2001 | Grunbok et al. | .............. | 235/379 |
| 6,439,345 B1 * | 8/2002 | Recktenwald et al. | ......... | 186/55 |
| 6,702,181 B2 * | 3/2004 | Ramachandran | ............. | 235/380 |
| 6,793,134 B2 * | 9/2004 | Clark | ............................ | 235/379 |
| 6,796,492 B1 * | 9/2004 | Gatto | ............................ | 235/379 |
| 6,973,442 B1 * | 12/2005 | Drummond et al. | ............ | 705/43 |

(Continued)

*Primary Examiner* — Mamon Obeid
(74) *Attorney, Agent, or Firm* — Joseph P. Mehrle

(57) ABSTRACT

A system that supports multi-stage transactions through the use of biometric tokens, such as fingerprint images or iris scans. A user pre-stages a transaction by providing transaction details that can be used a later time to complete the transaction, and the system stores the transaction details in a transaction record that is identified by a biometric token captured from the user. In some systems, the biometric token is captured as part of the pre-staging process. In other systems, the biometric token is retrieved from a data store after the user has provided authentication information, such as a bank card or user-identification code coupled with a secret PIN code. When the user is ready to complete the pre-staged transaction, the system captures a second biometric token from the user and matches the second token to the one identifying the user's transaction record. The transaction details contained in that transaction record are then used to complete the user's transaction.

11 Claims, 5 Drawing Sheets

(56) References Cited

U.S. PATENT DOCUMENTS

| | | | |
|---|---|---|---|
| 6,983,256 B2* | 1/2006 | Drummond et al. | 705/35 |
| 7,040,533 B1* | 5/2006 | Ramachandran | 235/379 |
| 7,231,068 B2* | 6/2007 | Tibor | 382/116 |
| 7,246,744 B2* | 7/2007 | O'Brien et al. | 235/382 |
| 7,314,164 B2* | 1/2008 | Bonalle et al. | 235/380 |
| 7,318,550 B2* | 1/2008 | Bonalle et al. | 235/380 |
| 7,333,638 B2* | 2/2008 | Chisamore et al. | 382/124 |
| 7,349,557 B2* | 3/2008 | Tibor | 382/115 |
| 7,419,091 B1* | 9/2008 | Scanlon | 235/379 |
| 7,464,059 B1* | 12/2008 | Robinson et al. | 705/67 |
| 7,472,827 B2* | 1/2009 | Fletcher | 235/380 |
| 7,624,050 B1* | 11/2009 | Drummond et al. | 705/35 |
| 7,647,624 B2* | 1/2010 | Burch et al. | 726/1 |
| 7,716,134 B2* | 5/2010 | Black et al. | 705/43 |
| 7,720,766 B2* | 5/2010 | Sakamoto | 705/57 |
| 7,770,204 B2* | 8/2010 | Pathakis et al. | 726/2 |
| 8,245,052 B2* | 8/2012 | Bjorn | 713/186 |
| 8,661,441 B2* | 2/2014 | Balko | 718/100 |
| 8,856,089 B1* | 10/2014 | Briggs et al. | 707/695 |
| 2002/0138432 A1* | 9/2002 | Makino et al. | 705/43 |
| 2003/0023511 A1* | 1/2003 | Gardner, Sr. | 705/27 |
| 2003/0061170 A1* | 3/2003 | Uzo | 705/64 |
| 2003/0125961 A1* | 7/2003 | Janda | 705/1 |
| 2003/0171996 A1* | 9/2003 | Chen et al. | 705/26 |
| 2003/0208684 A1* | 11/2003 | Camacho et al. | 713/186 |
| 2004/0111324 A1* | 6/2004 | Kim | 705/22 |
| 2004/0133477 A1* | 7/2004 | Morris et al. | 705/21 |
| 2004/0234117 A1* | 11/2004 | Tibor | 382/137 |
| 2005/0027543 A1* | 2/2005 | Labrou et al. | 705/1 |
| 2005/0097037 A1* | 5/2005 | Tibor | 705/39 |
| 2005/0125295 A1* | 6/2005 | Tidwell et al. | 705/16 |
| 2005/0125296 A1* | 6/2005 | Tidwell et al. | 705/16 |
| 2005/0182682 A1* | 8/2005 | Wiram | 705/16 |
| 2006/0016877 A1* | 1/2006 | Bonalle et al. | 235/380 |
| 2006/0050996 A1* | 3/2006 | King et al. | 382/312 |
| 2006/0076400 A1* | 4/2006 | Fletcher | 235/379 |
| 2006/0131412 A1* | 6/2006 | O'Brien et al. | 235/451 |
| 2006/0159316 A1* | 7/2006 | Chisamore et al. | 382/125 |
| 2006/0218083 A1* | 9/2006 | Bruer et al. | 705/39 |
| 2006/0282660 A1* | 12/2006 | Varghese et al. | 713/155 |
| 2007/0124820 A1* | 5/2007 | Burch et al. | 726/26 |
| 2007/0145114 A1 | 6/2007 | Militello et al. | |
| 2007/0198848 A1* | 8/2007 | Bjorn | 713/186 |
| 2008/0114697 A1* | 5/2008 | Black et al. | 705/67 |
| 2008/0320102 A1* | 12/2008 | Rordam et al. | 709/218 |
| 2010/0005151 A1* | 1/2010 | Gokhale | 709/216 |
| 2010/0332400 A1* | 12/2010 | Etchegoyen | 705/75 |
| 2013/0173474 A1* | 7/2013 | Ranganathan et al. | 705/67 |
| 2013/0268437 A1* | 10/2013 | Desai et al. | 705/41 |
| 2014/0025958 A1* | 1/2014 | Calman | 713/189 |
| 2014/0129437 A1* | 5/2014 | Desai et al. | 705/41 |
| 2014/0129438 A1* | 5/2014 | Desai et al. | 705/41 |
| 2014/0156534 A1* | 6/2014 | Quigley et al. | 705/71 |
| 2015/0032634 A1* | 1/2015 | D'Agostino | 705/71 |

* cited by examiner

USING BIOMETRIC TOKENS TO PRE-STAGE AND COMPLETE TRANSACTIONS

BACKGROUND

The self-service industry is constantly seeking ways to increase and improve self-service offerings and to improve customer adoption of self-service products. U.S. patent application Ser. No. 11/316,037, filed on behalf of NCR Corporation, describes an assisted self-service environment in which customers of a service organization, such as a banking establishment, initiate transactions on self-service terminals and then complete the transactions with teller assistance on teller terminals. This sort of assisted self-service model in the bank branch is one example of situations in which a service establishment and its customers carry out transactions in multiple stages—in this case staging the transaction at one terminal and completing the transaction at another with teller assistance.

These sorts of multi-stage transactions become particularly difficult when tight security is needed to protect valuable information or valuable items, such as in a banking environment where access to the customer's financial accounts is at stake. Conducting these multi-stage transactions typically requires authentication of the customer at each stage of the transaction, or else it requires transferal of authentication from one stage to the next by an authorized employee of the service establishment, to ensure that the proper customer—and only that customer—is granted access to the valuable information. Requiring the customer to present authentication information (such as a bank card and PIN code) at each transaction stage, however, is often frustrating to the customer, and requiring service-establishment employees to verify and transfer each customer's authentication is inefficient and costly.

SUMMARY

Described below is a system that supports multi-stage transactions through the use of biometric tokens, such as fingerprint images or iris scans. A user pre-stages a transaction by providing transaction details that can be used a later time to complete the transaction, and the system stores the transaction details in a transaction record that is identified by a biometric token captured from the user. In some systems, the biometric token is captured as part of the pre-staging process. In other systems, the biometric token is retrieved from a data store after the user has provided authentication information, such as a bank card or user-identification code coupled with a secret PIN code. When the user is ready to complete the pre-staged transaction, the system captures a second biometric token from the user and matches the second token to the one identifying the user's transaction record. The transaction details contained in that transaction record are then used to complete the user's transaction.

Other features and advantages will become apparent from the description and claims that follow.

DETAILED DESCRIPTION

Figure 1:
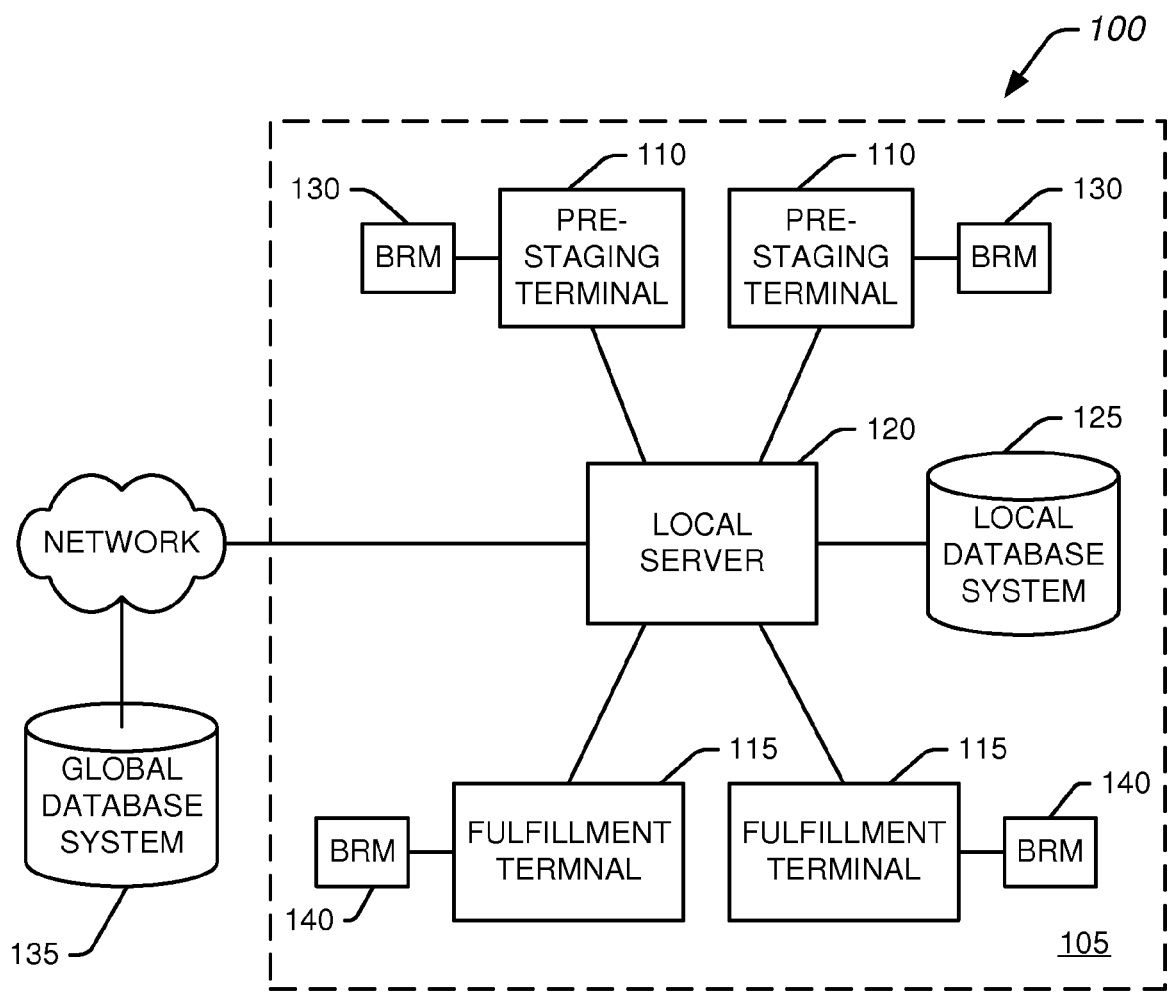
FIG. 1 is diagram showing a system for use in pre-staging and completing a transaction on terminals residing in a single physical location, such as a bank branch.

FIG. 1 shows a system 100 for use by a business establishment, such as a banking institution or a retailer of goods, in pre-staging and completing user transactions on terminals residing in a single physical location, or "branch" 105, such as a bank branch or a local retail store. The system includes one or more self-service pre-staging terminals 110 at which users initiate transactions with the business establishment. In a banking institution, for example, the pre-staging terminals 110 allow banking customers to engage in a wide variety of financial-service transactions, such as deposits to and withdrawals from cash accounts, cashing of checks, purchase of money orders and certified checks, and payment of balances due on bills and loans. While many transactions of these types are simple enough for completion on a single self-service terminal (SST), such as an automated-teller machine (ATM), these transactions are often of such complexity that the single SST does not suffice (e.g., when teller approval is needed in a bank for a cash withdrawal that exceeds ATM limits, or when retail goods must be handed over to a purchasing customer).

The pre-staging terminals 110 allow users, upon entering the branch 105, to begin or "pre-stage" transactions that are to be completed at fulfillment terminals 115 elsewhere in the branch 105. In pre-staging a transaction, the user provides critical transaction details to the business establishment through one of the pre-staging terminals 110. The pre-staging terminal 110 gathers the transaction details and delivers them to a local server system 120 in the branch 105, which in turn stores the details in a local data store, such as a relational database management system (RDBMS), or simply "database system" 125. The transaction details provided by the user usually include a wide variety of information, such as information identifying a transaction (or series of transactions) to be conducted, an account or payment method to be used, an amount of money involved, or a product to be purchased. Storage and management of transaction details is described in more detail below.

In many systems, each of the pre-staging terminals 110 includes an attached or embedded biometric reader module (BRM) 130, such as a fingerprint scanner or iris scanner, for use in capturing a biometric token that uniquely identifies each user who engages the terminal. As described in more detail below, the system uses the biometric token as a key or index to accessing the transaction details associated with the user's pre-staged transactions.

Alternatively, the business establishment maintains in its local database system 125 or in a global database system 135 located outside of the local branch 105 a biometric token that was captured from the user and stored at some earlier time (e.g., when the user first opened an account or otherwise began doing business with the business establishment). In these systems, the pre-staging terminals 110 each includes an authentication module, such as a card reader and encrypted PIN pad (EPP) device, that allows the system to authenticate the user at the pre-staging terminal and then retrieve the corresponding biometric token from the local or global database system.

Each of the fulfillment terminals 115 also includes an attached or embedded biometric reader module (BRM) 140 for use in capturing, once again, the user's biometric token when the user attempts to complete the pre-staged transaction. When the biometric token captured by the BRM 140 at the fulfillment terminal matches the biometric token associated with any of the transaction details stored in the local database system 125, the local server 120 retrieves those transaction details and delivers them to the fulfillment terminal for completion of the pre-staged transaction.

In this manner, biometric tokens serve not simply as a means to identify or authenticate a user at a self-service terminal as has been done in the past, but rather as a means for (1) recognizing at fulfillment terminals 115 those users who have pre-staged transactions pending and (2) accessing the corresponding transaction details in the branch's local database system 125. The distinction is significant. The use of biometric tokens in the traditional manner simply for identifying and authenticating users requires each service establishment to store a vast array of biometric tokens (e.g., one or more for every customer) and scan this array of tokens for a match every time a user seeks authentication. With the system described here, the business establishment can, if it chooses to do so, store only those biometric tokens associated with users who have pre-staged transactions pending. The business establishment does this by capturing the biometric token once at the time that the user pre-stages the transaction; storing the biometric token along with the transaction details for the pre-staged transaction; capturing the biometric token again when the user attempts to complete the pre-staged transaction; and then discarding the biometric token altogether when a match is found and the corresponding transaction details are delivered to the fulfillment terminal for completion of the pre-staged transaction.

Even when the service establishment chooses to maintain a global record of biometric tokens for all of its users and rely on traditional authentication techniques at the pre-staging terminals, it nevertheless eliminates the need to rely on traditional authentication techniques at the fulfillment terminal. This becomes particularly important in systems like that shown in FIG. 3 and described in detail below, in which users pre-stage transactions at remote pre-staging terminals, such as personal computers located in their homes, for fulfillment at a later time in the branch.

Figure 2:
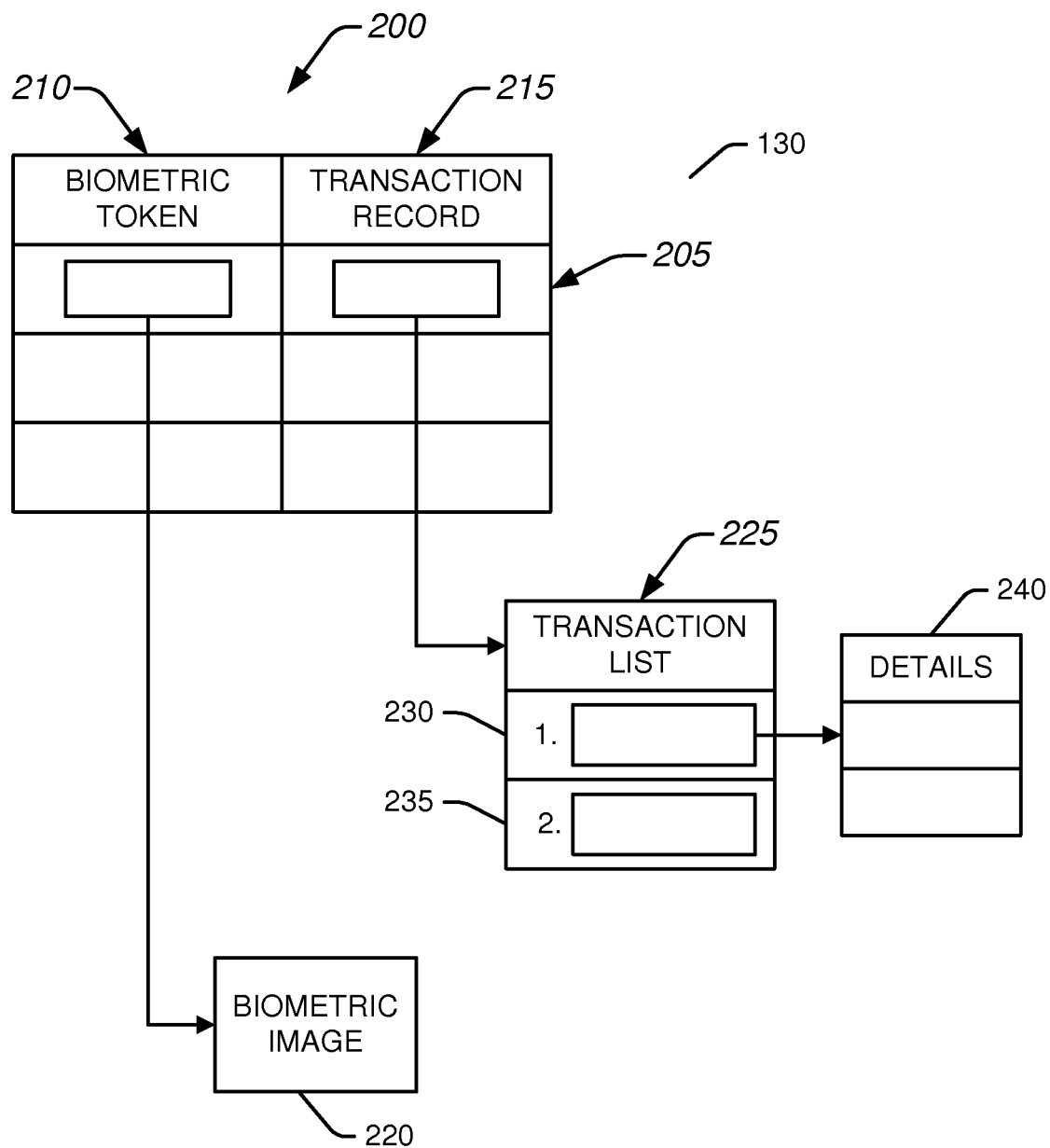
FIG. 2 is a diagram showing a structure for one or more database tables used to maintain transaction records and biometric tokens associated with pre-staged transactions.

FIG. 2 shows a structure for one or more database tables used to maintain transaction details and biometric tokens associated with pre-staged transactions. When a user engages a pre-staging terminal like those described above, the database system (125 in FIG. 1) receives the transaction details associated with the pre-staged transaction and the corresponding biometric token captured from the user. On receiving this information, the database system creates a row 205 in a database table 200 which, in this example, has at least two columns: (1) a "Biometric Token" column 210 that stores the biometric token 220, and (2) a "Transaction Record" column 215 that stores transaction details for the pre-staged transaction that is indexed by the biometric token. In some systems, the database table 200 stores in the "Biometric Token" column 210 a pointer to the biometric token 220, which itself is stored outside of the database table, and stores in the "Transaction Record" column 215 a "Transaction List" data structure 225 (or a pointer to this data structure) that provides a list of multiple transactions that the user has pre-staged for completion at a later time. Each entry 230, 235 in the "Transaction List" data structure 230 in turn stores a "Details" data structure 240 (or a pointer to this data structure) that contains the transaction details required to complete each of the transactions appearing in the transaction list.

When the user engages a fulfillment terminal to complete a pre-staged transaction, the fulfillment terminal captures the user's biometric token, as described above, and submits it to the database system for comparison to the tokens stored in the "Biometric Token" column 210 of the database table 200. If a matching token is found in the table, the database system returns all of the transaction information stored in the row 205 identified by the token. In many systems, the database system then deletes the row 205 from the database table 200 and destroys all of the information stored in the row, including the biometric token 220. In some systems, the row 205 of data remains in the database table 200 even after it has been delivered to the fulfillment terminal. For example, some systems retain the data until the fulfillment terminal indicates that the transaction has completed successfully. Some systems also define a time limit, or expiration time, for completion of the transaction and include this expiration time with the transaction information stored in the row 205. If the user does not complete the transaction before the expiration time is reached, the system deletes the row 205 from the table and thus destroys the information stored in the row.

Figure 3:
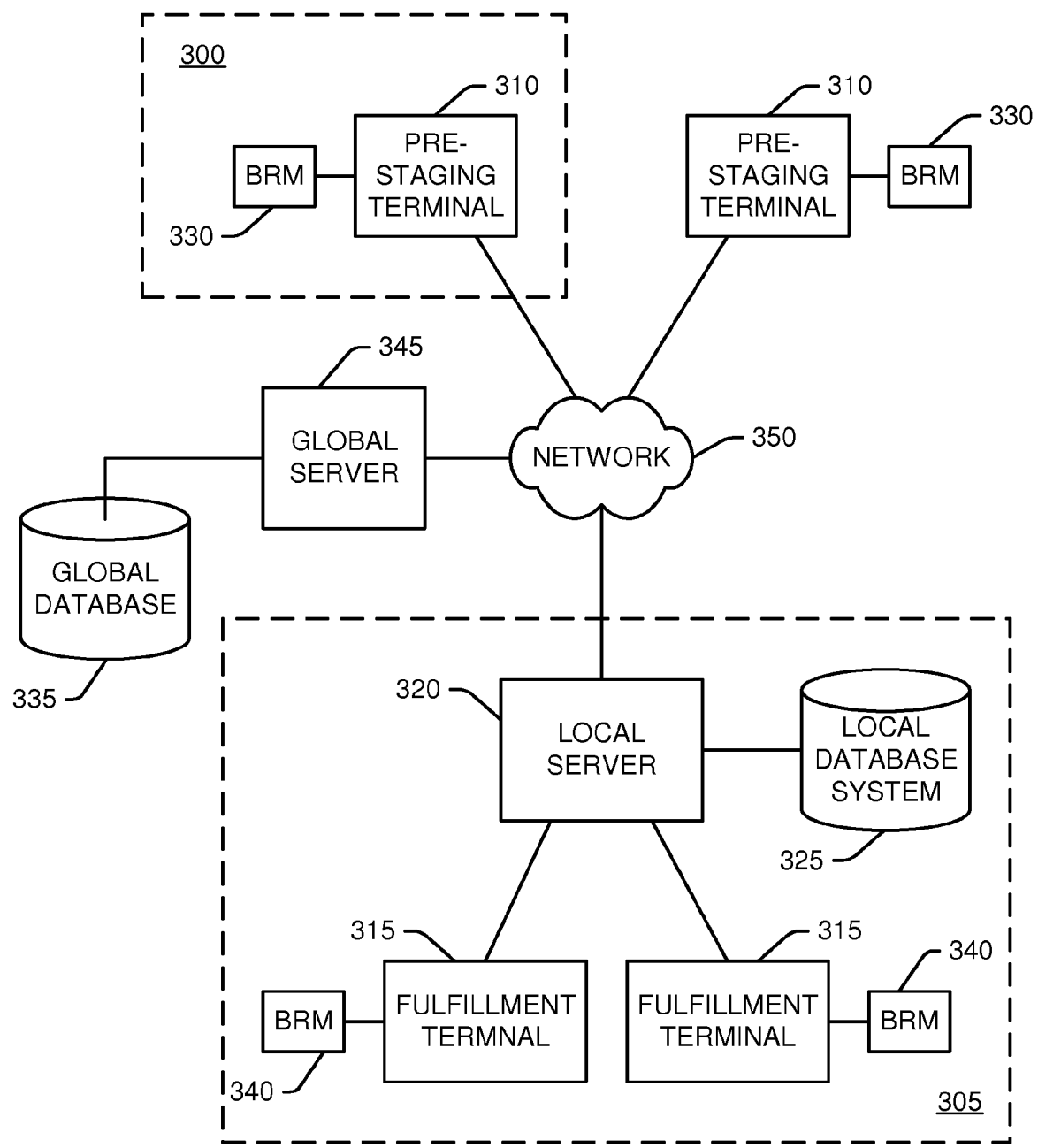
FIG. 3 is a diagram showing a system for use in pre-staging and completing a transaction on terminals residing in separate physical locations, such as a user's home on one end and a bank branch on the other end.

FIG. 3 shows a system for use in pre-staging and completing a transaction on terminals residing in separate physical locations, such as a user's home 300 on one end and a local branch 305 on the other. As with system of FIG. 2, users of the system of FIG. 3 engage pre-staging terminals 310 to initiate transactions that are to be completed at fulfillment terminals 310 in the branch 305. In this example, however, the pre-staging terminals 310 are remote terminals that do not reside in the branch 305, but instead reside in other physical locations. For example, in some such systems, one or more of the remote pre-staging terminals 310 is implemented as a personal computer (PC) system residing in a user's home (e.g., a PC configured to utilize home-banking services provided by a banking institution).

In these systems, the remote pre-staging terminals 310 typically interact with a global server 345 of the business establishment through a wide-area network 350, such as the World Wide Web. The global server 345 in turn interacts with a local server 320 at the branch 305 that the user has selected for completion of the pre-staged transaction.

As with the pre-staging terminals 110 of FIG. 2, some of the pre-staging terminals 310 of FIG. 3 include attached or embedded biometric reader modules (BRMs) 330, such as fingerprint scanners or iris scanners, for use in capturing biometric tokens that uniquely identify the users engaging the terminals. Other pre-staging systems 310 do not include BRMs 330 and instead rely on traditional authentication techniques (e.g., user ID and PIN combinations) to authenticate the users at the terminals.

For remote pre-staging terminals without BRMs, the business establishment maintains in its global database system 335 a previously captured biometric token for each of the users authorized to pre-stage transactions at one of these remote terminals. Upon authenticating a user at one of these remote pre-staging terminals, the global database system 335 delivers the biometric token to the local database system 325 in the branch 305 along with the transaction details associated with the pre-staged transaction.

Within the branch 305, each of the fulfillment terminals 315 includes an attached or embedded biometric reader module (BRM) 340. When the user enters the branch 305 to complete a pre-staged transaction, the BRM 340 at the fulfillment terminal 315 captures the user's biometric token and delivers it to the local database system 325. As described above, if the biometric token captured at the fulfillment terminal 340 matches the biometric token associated with any of the transaction details stored in the local database system 325, the local server 320 retrieves those transaction details and delivers them to the fulfillment terminal for completion of the pre-staged transaction.

Figure 4:
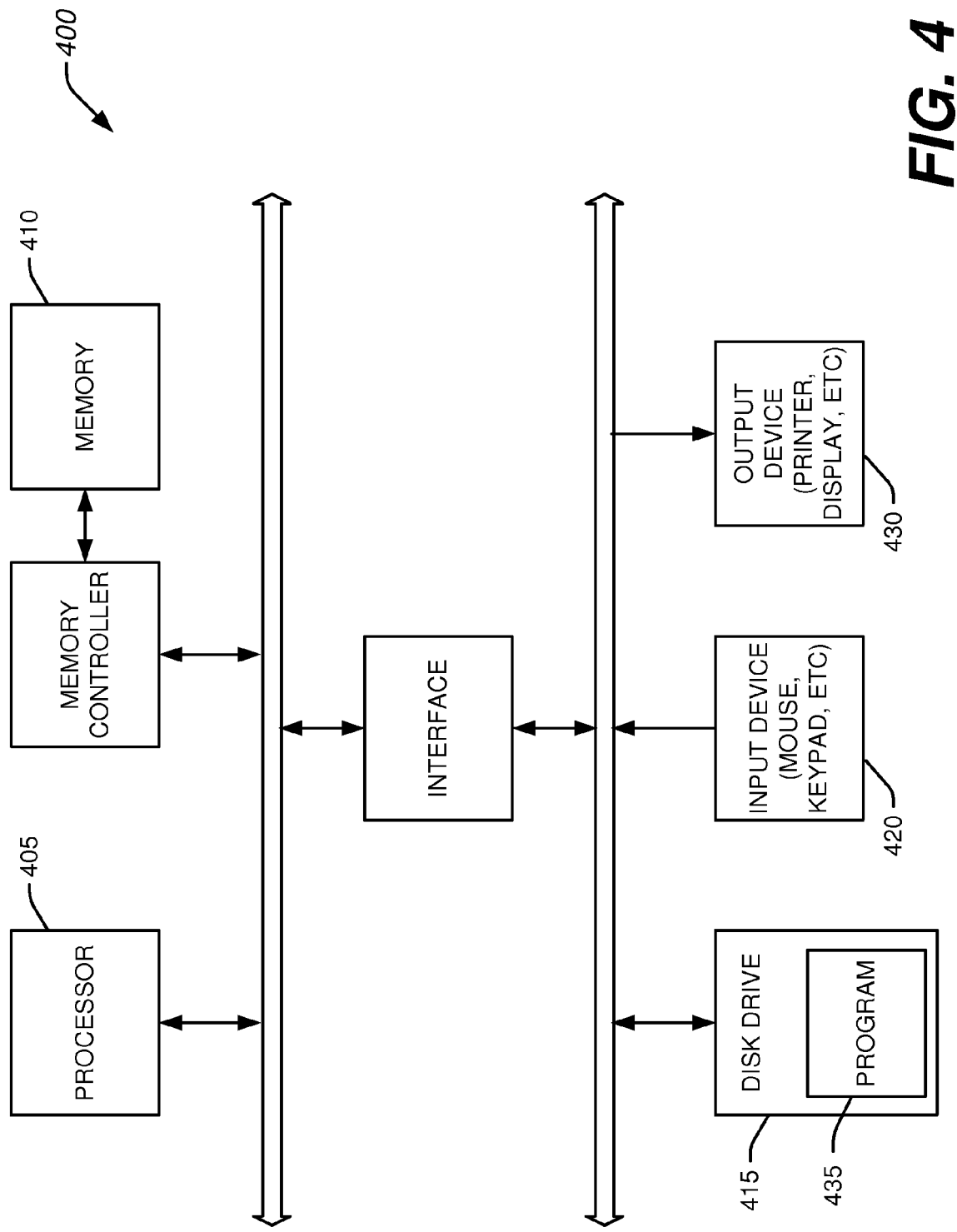
FIG. 4 is a diagram of a computer system architecture suited for use in carrying out portions of the systems of FIGS. 1 and 3.

FIG. 4 shows an architecture for a computer system 400 suited for use in implementing the pre-staging terminals, the fulfillment terminals, and even the local and global servers. In general, the computer 400 includes one or more processors 405, one or more temporary data-storage components 410 (e.g., volatile and nonvolatile memory modules), one or more persistent data-storage components 415 (e.g., optical and magnetic storage devices, such as hard and floppy disk drives, CD-ROM drives, and magnetic tape drives), one or more input devices 420 (e.g., mice, keyboards, and touch-screens), and one or more output devices 430 (e.g., display consoles and printers). For fulfillment terminals and many pre-staging terminals, the input devices found in the computer system also include a biometric reader module, such as a fingerprint or iris scanner.

The computer 400 includes executable program code 435 that is usually stored in one of the persistent storage media 415 and then copied into memory 410 at run-time. The processor 405 executes the code by retrieving program instructions from memory in a prescribed order. When executing the program code, the computer receives data from the input and/or storage devices, performs operations on the data, and then delivers the resulting data to the output and/or storage devices.

In some embodiments, the computer is a special-purpose computer that performs only certain, specialized functions. In other embodiments, the computer is a general-purpose computer programmed to perform the functions needed by the business establishment.

Figure 5:
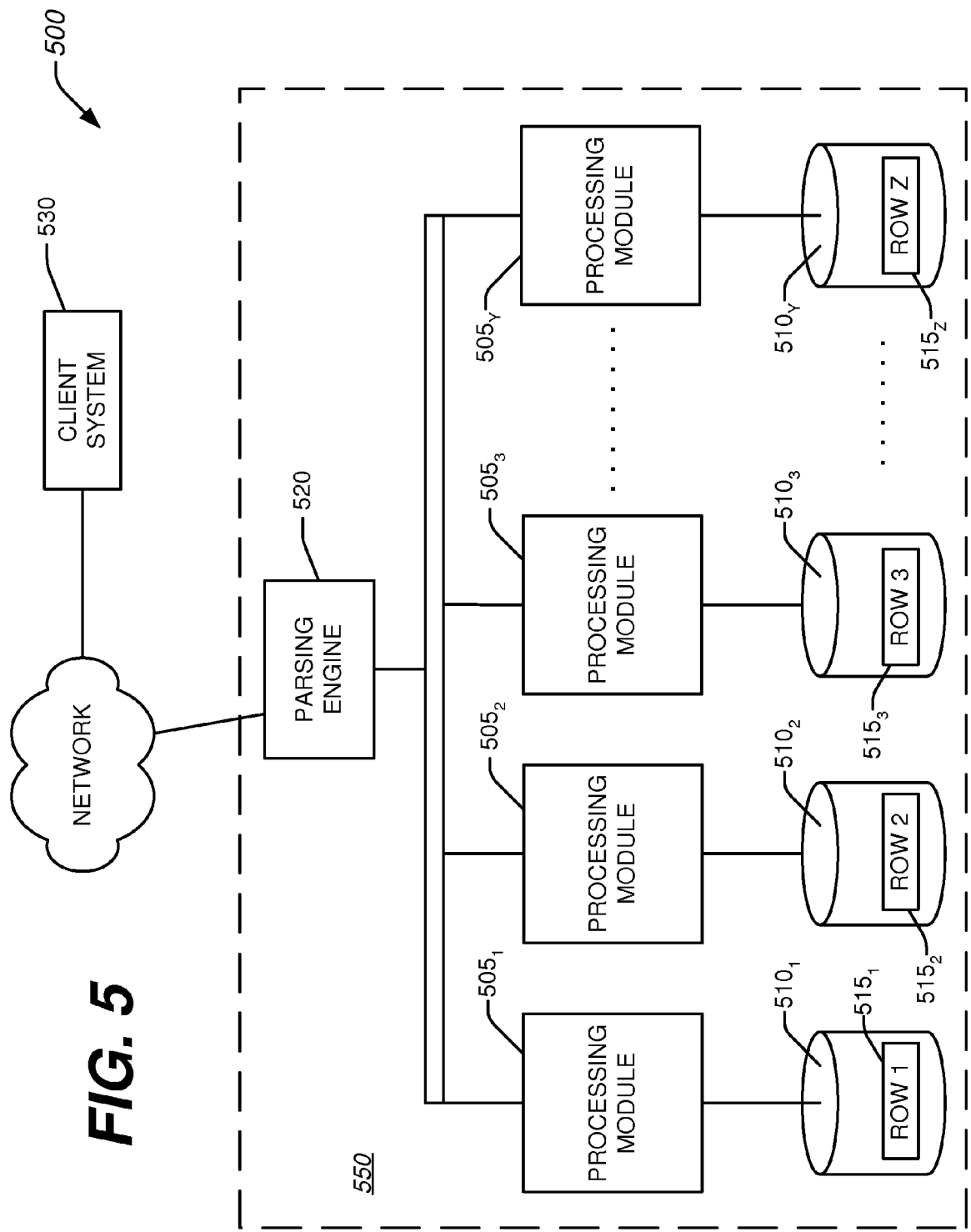
FIG. 5 is a diagram of a database system architecture suited for use in carrying out portions of the systems of FIGS. 1 and 3

FIG. 5 shows an architecture for a database system 500 that is suited for use in implementing the local and global database systems described above. In this example, the database system 500 includes a relational database management system (RDBMS) built upon a massively parallel processing (MPP) platform. Other types of database systems, such as object-relational database management systems (ORDBMS) or those built on symmetric multi-processing (SMP) platforms, are also suited for use here.

As shown here, the database system 500 includes one or more processing modules $505_{1 \ldots Y}$ that manage the storage and retrieval of data in data-storage facilities $510_{1 \ldots Y}$. Each of the processing modules $505_{1 \ldots Y}$ manages a portion of a database that is stored in a corresponding one of the data-storage facilities $510_{1 \ldots Y}$. Each of the data-storage facilities $510_{1 \ldots Y}$ includes one or more disk drives.

The system stores transaction details and biometric tokens in one or more tables in the data-storage facilities $510_{1 \ldots Y}$. The rows $515_{1 \ldots Z}$ of the tables are stored across multiple data-storage facilities $510_{1 \ldots Y}$ to ensure that the system workload is distributed evenly across the processing modules $505_{1 \ldots Y}$. A parsing engine 520 organizes the storage of data and the distribution of table rows $515_{1 \ldots Z}$ among the processing modules $505_{1 \ldots Y}$. The parsing engine 520 also coordinates the retrieval of data from the data-storage facilities $510_{1 \ldots Y}$ in response to queries received from a user at a mainframe or a client computer 530. The database system usually receives queries in a standard format, such as the Structured Query Language (SQL) put forth by the American National Standards Institute (ANSI).

The text above describes one or more specific embodiments of a broader invention. The invention also is carried out in a variety of alternative embodiments and thus is not limited to those described here. Many other embodiments are also within the scope of the following claims.

We claim:

1. A method for conducting a transaction between a service establishment and a user, the method comprising:
    completing a first portion of the transaction between the service establishment and the user at a first computer by:
        receiving from the user information that includes transaction details related to the transaction;
        creating a database transaction record in a database of the service establishment that stores the transaction details for retrieval in completing a last portion of the transaction at a later time; and
        storing a first biometric token which has been captured from the user's body in the database of the service establishment as a key or index identifier of the database transaction record; and
    at some time thereafter completing the last portion of the transaction by:
        capturing a second biometric token from the user's body by a second computer different from the first computer, the second computer being located at the service establishment;
        concluding that the second biometric token matches the first biometric token in the database of the service establishment;
        in response:
            retrieving the database transaction record associated with the first portion and identified by the first biometric token by the second computer; and
            providing the transaction details to allow completing the last portion of the transaction by the second terminal; and
        destroying the biometric tokens after either:
            completing the last portion of the transaction; or
            expiration of a period within which the last portion of the transaction has not been completed.

2. The method of claim 1, where completing the first portion of the transaction includes capturing the first biometric token from the user's body.

3. The method of claim 1, where completing the first portion of the transaction includes receiving from the user information that authenticates the user.

4. The method of claim 3, where completing the first portion of the transaction includes, after authenticating the user, retrieving the first biometric token from a data store.

5. The method of claim 1, where the first computer is located at the service establishment.

6. The method of claim 1, where the first computer comprises a personal computer in the user's home.

7. The method of claim 1, where completing the first portion of the transaction further includes:
    receiving from the user additional information that includes additional transaction details related to additional transactions to be completed at additional later times;
    including in the transaction record the additional transaction details for each of the additional transactions.

8. The method of claim 1, where storing the first biometric token includes storing an image of a fingerprint captured from the user.

9. The method of claim 8, where capturing the second biometric token includes capturing another image of the user's fingerprint.

10. The method of claim 1, where storing the first biometric token includes storing an iris scan captured from the user.

11. The method of claim 9, where capturing the second biometric token includes conducting another scan of the user's iris.

\* \* \* \* \*